US 10,891,456 B2

(12) United States Patent
Guidard et al.

(10) Patent No.: US 10,891,456 B2
(45) Date of Patent: Jan. 12, 2021

(54) BARCODE READER

(71) Applicant: Revenue Collection Systems France SAS, Plessis Pate (FR)

(72) Inventors: Jérôme Guidard, Bretigny-sur-Orge (FR); Thierry D'Athis, Bretigny-sur-Orge (FR)

(73) Assignee: REVENUE COLLECTION SYSTEMS FRANCE SAS, Plessis Pate (FR)

( * ) Notice: Subject to any disclaimer, the term of this patent is extended or adjusted under 35 U.S.C. 154(b) by 0 days.

(21) Appl. No.: 16/472,183

(22) PCT Filed: Dec. 28, 2017

(86) PCT No.: PCT/EP2017/084725
§ 371 (c)(1),
(2) Date: Jun. 20, 2019

(87) PCT Pub. No.: WO2018/122316
PCT Pub. Date: Jul. 5, 2018

(65) Prior Publication Data
US 2019/0354737 A1 Nov. 21, 2019

(30) Foreign Application Priority Data
Dec. 29, 2016 (FR) .................................... 16 01892

(51) Int. Cl.
*G06K 7/10* (2006.01)
*G06K 7/14* (2006.01)
(52) U.S. Cl.
CPC ....... *G06K 7/1413* (2013.01); *G06K 7/10732* (2013.01); *G06K 7/10831* (2013.01)

(58) Field of Classification Search
CPC .......... G06K 7/10712; G06K 7/10732; G06K 7/10821; G06K 7/10831; G06K 7/10881; G06K 7/1404; G06K 7/1413
See application file for complete search history.

(56) References Cited

U.S. PATENT DOCUMENTS 9,886,611 B2 * 2/2018 Yamamoto ......... G06K 7/10831
2006/0131419 A1 6/2006 Nunnink
(Continued)

FOREIGN PATENT DOCUMENTS

| DE | 10 2007 043 609 A1 | 3/2009 |
| KR | 10-0534030 B1 | 11/2005 |
| KR | 10-1120600 B1 | 3/2012 |

OTHER PUBLICATIONS

French Search Report, from the French Patent Office in counterpart French Application No. 1601892, dated Sep. 28, 2017.
(Continued)

*Primary Examiner* — Thien M Le
*Assistant Examiner* — April A Taylor
(74) *Attorney, Agent, or Firm* — Arent Fox LLP

(57) ABSTRACT

The present invention relates to a barcode reader comprising a casing, a pane, the pane and casing defining an interior volume; a reading head, and a light source that is able to emit light beams.

Each light source and the pane are arranged so that all the transmitted light beams emerge from an outer face of the pane with an angle ($\alpha$) smaller than or equal to 35 degrees with said outer face. An inner face of the pane includes a peripheral entry face for incident beams, each light source being arranged opposite said peripheral face with its illumination direction perpendicular to said peripheral face, said peripheral face being inclined with respect to a direction (Continued)

normal to a plate of the pane and making up an angle (β) strictly larger than 48.19 degrees with said normal direction.

9 Claims, 4 Drawing Sheets

(56) References Cited

U.S. PATENT DOCUMENTS

| | | |
|---|---|---|
| 2007/0131770 A1 | 6/2007 | Nunnink |
| 2011/0139875 A1* | 6/2011 | Naito ................. G06K 7/10732 235/470 |
| 2012/0074338 A1 | 3/2012 | Shearin et al. |
| 2013/0082106 A1 | 4/2013 | Hoshina et al. |
| 2015/0254487 A1 | 9/2015 | Leitner et al. |

OTHER PUBLICATIONS

International Search Report in counterpart PCT Application No. PCT/EP2017/084725 dated Dec. 28, 2017.

\* cited by examiner

BARCODE READER

CROSS-REFERENCE TO RELATED APPLICATIONS

This application is a National Stage entry of International Application No.: PCT/EP2017/084725, filed Dec. 28, 2017, which claims priority to French Patent Application No. 16 01892, filed Dec. 29, 2016. The disclosures of the priority applications are hereby incorporated in their entirety by reference.

BACKGROUND OF THE INVENTION

Field of the Invention

The present invention relates to a barcode reader comprising:
a casing in which a window is arranged,
a transparent pane fastened in the window of the casing, the pane comprising a plate,
the pane and the casing defining an inner volume of the barcode reader, the pane having an inner face located in the inner volume and an outer face located outside the inner volume,
a reading head, arranged in the inner volume facing the pane, and configured to acquire a barcode present opposite the outer face of the pane, and
at least one light source arranged in the inner volume, able to emit beams of light, and configured to illuminate the barcode.

The invention for example falls within the field of ticketing systems used in access platforms to a public transportation network. These ticketing systems allow users, after having scanned a barcode, to open an access gate to the public transportation network.

The barcodes can be one-dimensional (1D) or two-dimensional (2D) barcodes carried by multiple different media, such as a paper medium, a plastic card, or a smartphone, tablet or computer screen.

The barcode readers must on the one hand decode the barcode correctly, but also comply with functional requirements such as the presentation time of the barcode to the reader and the barcode-reader distance, such that the barcode reader can read said code correctly. Such requirements in particular make it possible to guarantee the fluidity of the passage of users at the gates.

It appears that these requirements are related to the illumination of the barcode to be decoded. Indeed, it is necessary to control the lighting of the barcode so that the reading of the barcode can be done.

Description of Related Art

Barcode readers are currently known having a light source inside the reader pointed toward the transparent pane of the reader to illuminate the barcode presented opposite the transparent pane. The internal light source has several light sources capable of emitting beams of light oriented substantially perpendicular to the pane to illuminate the barcode.

This type of barcode reader is not fully satisfactory. Indeed, users are blinded by the light source, often comprising LEDs (Light-Emitting Diodes), emitting high-intensity light radiation and blue light.

Furthermore, the beams emitted by the light sources are reflected on the surface of certain barcode media toward the reading head of the reader, which greatly deteriorates the decoding of the barcode.

One of the aims of the invention is to offset these drawbacks by proposing a barcode reader limiting the blinding of the user and the reflection of the beams of light on all of the aforementioned media toward the reading head while providing sufficient illumination of the presented media.

BRIEF SUMMARY OF THE INVENTION

To that end, the invention relates to a reader of the aforementioned type in which the or each light source and the pane are arranged such that all of the light beams transmitted through the pane emerge from the outer face of the transparent pane with an angle smaller than or equal to 35 degrees with the outer face of the pane.

According to other features of the inventive barcode reader:
the or each light source and the pane are arranged such that the incident light beams on the inner face of the pane form an angle with incidence smaller than or equal to 35 degrees with the inner face of the pane;
the or each light source is arranged in a peripheral zone of the pane, the peripheral zone being a zone of the inner volume, radially offset toward the outside relative to the peripheral edge of the pane, and axially by a distance smaller than 20% of the distance separating the pane from the reading head;
it includes an opaque screen arranged between an edge of the pane and the or each light source;
it includes an opaque screen arranged between the or each light source and the reading head;
the inner face of the pane includes a peripheral entry face for incident beams, the or each light source being arranged opposite the peripheral entry face with its illumination direction substantially perpendicular to the peripheral entry face;
the peripheral entry face is inclined relative to a direction normal to the plate of the pane and forms an angle strictly greater than 48.19 degrees with the direction normal to the plate;
the peripheral entry face has a plurality of portions, each portion being adjacent to an edge of the pane, each portion of the peripheral entry face being inclined by an angle strictly greater than 48.19 degrees with the direction normal to the plate.
the plate is provided with a bevel delimiting the peripheral entry face;
the pane has a prism alongside the plate, a free face of the prism forming the peripheral entry face; and
the or each light source and the pane are arranged such that all of the light beams transmitted through the pane emerge with an angle smaller than or equal to 10 degrees relative to the outer face of the pane.

BRIEF DESCRIPTION OF THE SEVERAL VIEWS OF THE DRAWINGS

Other aspects and advantages of the invention will appear upon reading the following description, provided solely as an example, and done in reference to the appended drawings, in which.

DETAILED DESCRIPTION OF THE INVENTION

Figure 1:
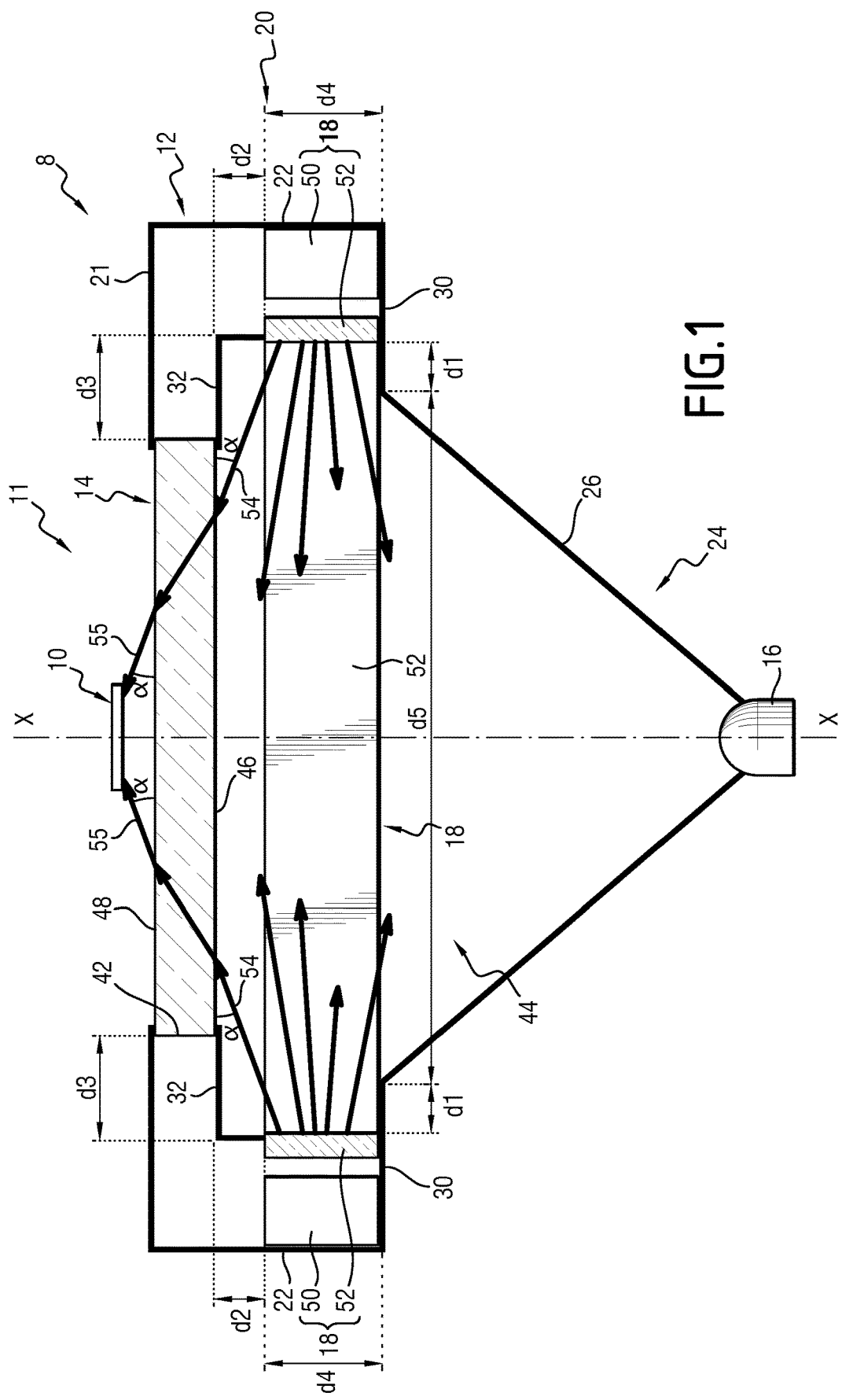
FIG. 1 is an axial sectional view of a barcode reader.

A structure of a barcode reader 8 is described in reference to FIG. 1.

FIG. 1 is a schematic figure and is not to scale with respect to the numerical values indicated in the remainder of the description.

In reference to FIG. 1, the barcode reader 8 is suitable for reading and processing a barcode carried by a medium such as a paper, a plastic card, or a screen of a smartphone, a tablet or a laptop computer. Such a medium comprising a barcode is identified by reference 10.

The barcode reader 8 has a reading axis X-X along which the barcode medium 10 must be arranged, with the barcode, facing a front face of the barcode reader 8, designated by reference 11 in FIG. 1.

The barcode reader 8 includes a casing 12 closed by a transparent pane 14, centered on the axis X-X and forming the central part of the front face 11 of the reader 8.

A reading head 16 and up to four lateral light sources 18 are arranged in the casing 12.

The reading head 16 is configured to acquire and read the barcode presented opposite the front face 11 of the reader 8.

The casing 12 has a front portion 20 that has a substantially parallelepiped shape, comprising a front wall 21 and four side walls 22, and a rear portion 24 that is substantially pyramid-shaped, made up of a wall 26, receiving, at its tip along the axis X-X, the reading head 16.

The length of the wall 26, in the axial section plane, is between 77 mm and 78 mm.

The front portion 20 is centered along the axis of the pyramid-shaped rear portion 24. The front 20 and rear 24 portions are for example made from a black and matte material. The front portion 20 and the rear portion 24 are connected to one another by a connecting wall 30, extending parallel to the front face 11 of the reader 8. As shown in FIG. 1, the connecting wall 30 forms a shoulder of the casing 12.

A portion of the connecting wall 30, identified by the distance d1, forms an opaque screen inserted between the light sources 18 and the reading head 16. This opaque screen extends between an edge of the light source 18 and the beginning of the pyramid-shaped rear portion 24. For example, the distance d1 is between 5 mm (millimeters) and 8 mm. As an illustration, d1 is 6 mm.

The connecting wall 30 is made from a black and matte material.

In a variant, in the case where the rear portion 24 has a parallelepiped shape and the same size as the front portion 20, the opaque screen formed by the portion of the connecting wall 30 identified by the distance d1 is an attached plate, for example made from a black and matte material, arranged between the light sources 18 and the reading head 16.

The barcode reader 8 further includes an inner diaphragm 32 extending between the peripheral edges of the pane 14 and the light sources 18, and forms an opaque screen inserted between the edges of the pane 14 and the light sources 18. The inner face of the diaphragm 32 is made from a black and matte material. For example, the diaphragm 32 is made from a non-reflective material.

A window 42 arranged in the front wall 21 of the casing receives the pane 14. The casing 12 and the pane 14 form an inner volume 44 of the barcode reader 10.

The transparent pane 14 is formed by a plate having a substantially parallelepiped shape.

The transparent pane 14 is for example made from glass, such as tempered glass, and has an anti-reflective treatment on an inner face 46, facing toward the inner volume 44 and on an outer face 48, facing toward the outside of the barcode reader 8.

The glass has an optical index of about 1.5.

The inner and outer faces 46, 48 are substantially parallel and define a pane thickness of about 6 mm.

The reading axis X-X is normal to the inner face 46 and the outer face 48 of the pane 14.

A direction normal to the plate of the pane 14 is defined.

The direction normal to the plate extends along a direction parallel to the reading axis X-X.

The light sources 18 are arranged in the inner volume 44 of the barcode reader 8, at a distance from the pane 14 in a radial direction and an axial direction. "Radial direction" here refers to a direction that extends from a peripheral edge of the pane 14 in the plane of the pane 14, and "axial direction" refers to a direction perpendicular to the plane of the pane 14.

In other words, the light sources 18 are arranged in a peripheral zone of the pane 14, i.e., a zone of the inner volume 44 of the pane, radially offset relative to the peripheral edge of the pane 14, and axially by a distance smaller than 20% of the distance separating the pane 14 from the reading head 16. More specifically, the light sources 18 are radially and axially offset relative to the edge of the pane 14.

For example, the axial offset, identified in FIG. 1 by the distance d2, is between 12 mm and 14 mm. As an illustration, d2 is 13 mm.

For example, the radial offset, identified in FIG. 1 by the distance d3, is between 10 mm and 11 mm. As an illustration, d3 is 10 mm.

The distances d2 and d3 respectively represent the axial and radial distance, separating the light source 18 from the closest edge of the pane 14.

The four light sources 18 each comprise a row of light sources, for example a series of LEDs 50, and a diffusing element 52. In the case of a configuration whereof the number of light sources is less than four, the diffusing element 52 in front of the missing light source will be replaced by a matte black opaque material.

Each series of LEDs 50 is arranged lateral walls 22, against the connecting wall 30.

The diffusing elements 52 are arranged along the emission axis of the light sources 18 to generate a wider beam of light or wider array, substantially conical in the inner volume 44, with an axis of the beam diffused parallel to the plate forming the pane 14. The diffusing elements 52 are arranged in the extension of the inner diaphragm 32, against the connecting wall 30. The diffusing elements 52 are such that no beam of the diffused beam arrives on the inner face 46 of the pane 14 with an angle α of more than 35 degrees.

A width of the diffusing element 52 is defined measured along the axis X-X, identified in FIG. 1 by the distance d4. For example, d4 measures 10 mm.

A distance d5 is also defined in FIG. 1 called "cone opening". The distance d5 is measured along a direction perpendicular to the axis X-X. As an illustration, d5 measures 78 mm.

The operation of the barcode reader 10 will now be described.

The light sources 18 each emit a beam or array or light, oriented toward the inner volume 44 of the casing 12, and form an incident beam on the entire surface of the pane 14.

All of the beams of light from the light lights 18 or incident beams of light arrive on the inner face 46 of the pane 14 with an incidence angle α smaller than or equal to 35 degrees with the inner face 46 of the pane 14. Two incident light beams 54 and the corresponding incidence angles α are identified in FIG. 1.

In a known manner, the same angle α is found between the beam 55 transmitted through the pane 14 and the outer face 48 of the pane 14. Thus, all of the light beams 55 transmitted through the pane 14 have an angle smaller than 35 degrees with the outer face 48 of the pane 14.

The barcode 10 is illuminated with a so-called "low-angled" light.

In fact, the illumination of the matte and planar or convex surfaces is satisfactory.

Furthermore, due to the inner diaphragm 32, no light beam is transmitted through the front wall 21, or penetrates the pane 14 through one of its lateral edges.

Figure 2:
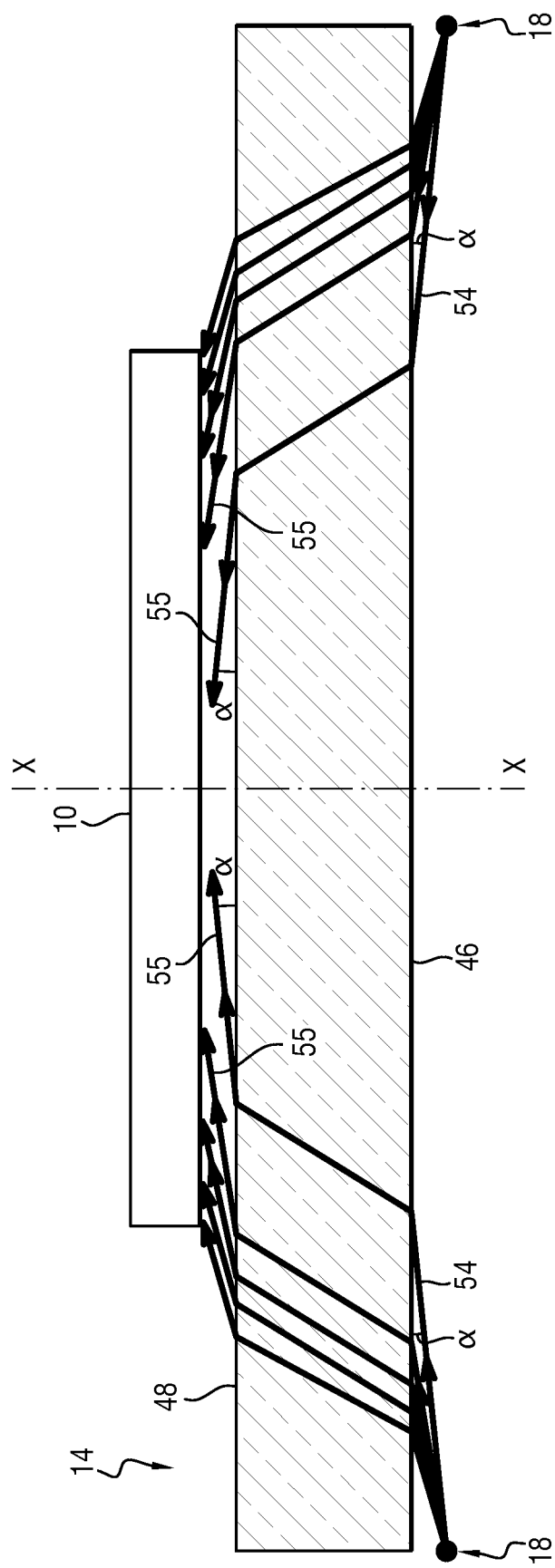
FIG. 2 is a sectional detail view of an incident beam arriving on the transparent pane of the barcode reader according to a variant of FIG. 1.

In the embodiment variant of FIG. 2, all of the elements are identical to the embodiment of FIG. 1 with the exception of the position of the light sources 18. They are offset axially relative to the peripheral edge of the pane 14, but arranged in line with the pane 14. They emit a narrow incident light beam or array. The incident angle α formed between the incident beam 54 and the inner face 46 of the pane 14 is smaller than or equal to 10 degrees. This same angle α is found between the light beam 55 transmitted through the pane 14 and the outer face 48 of the pane 14.

Figure 3:
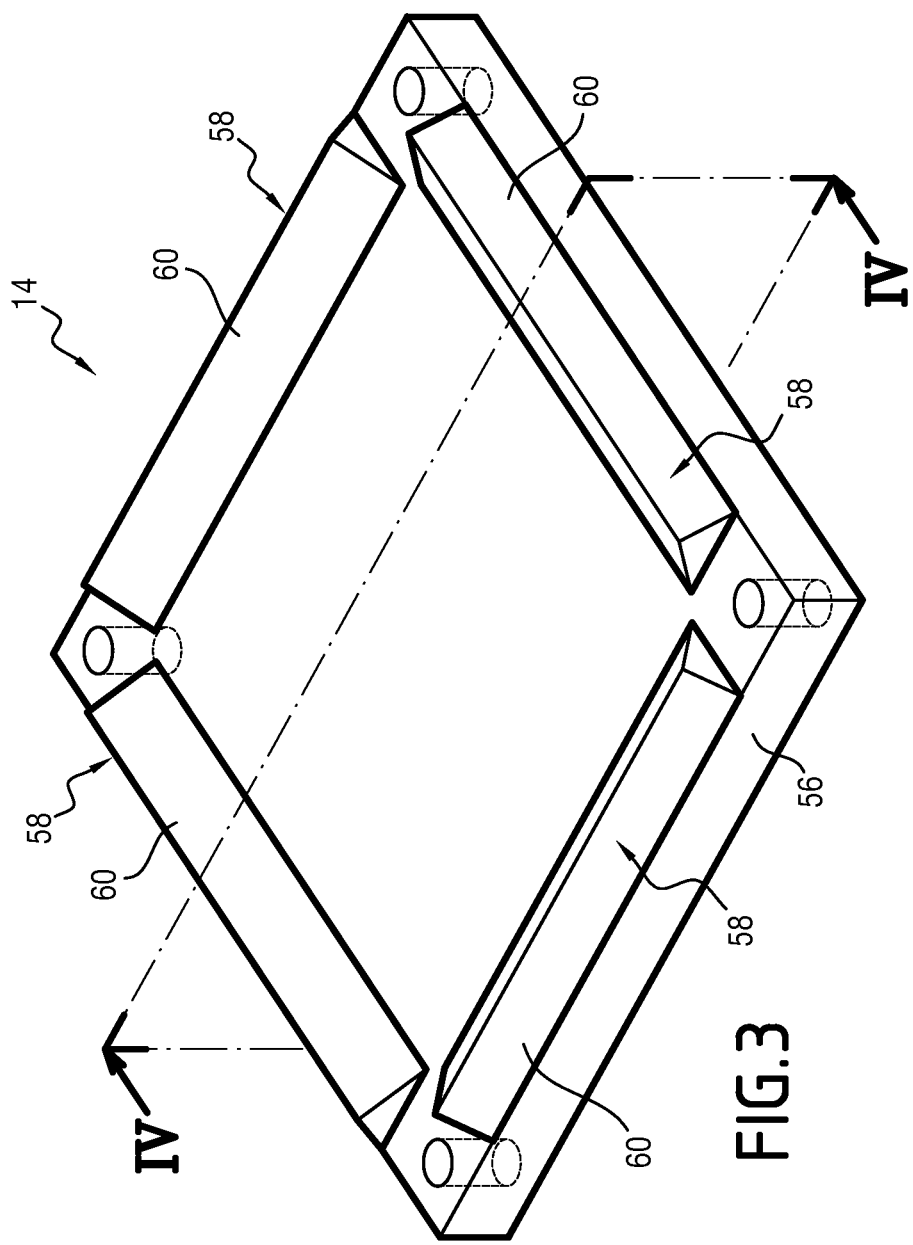
FIG. 3 is a perspective view of the transparent pane according to a first embodiment of the invention.
Figure 4:
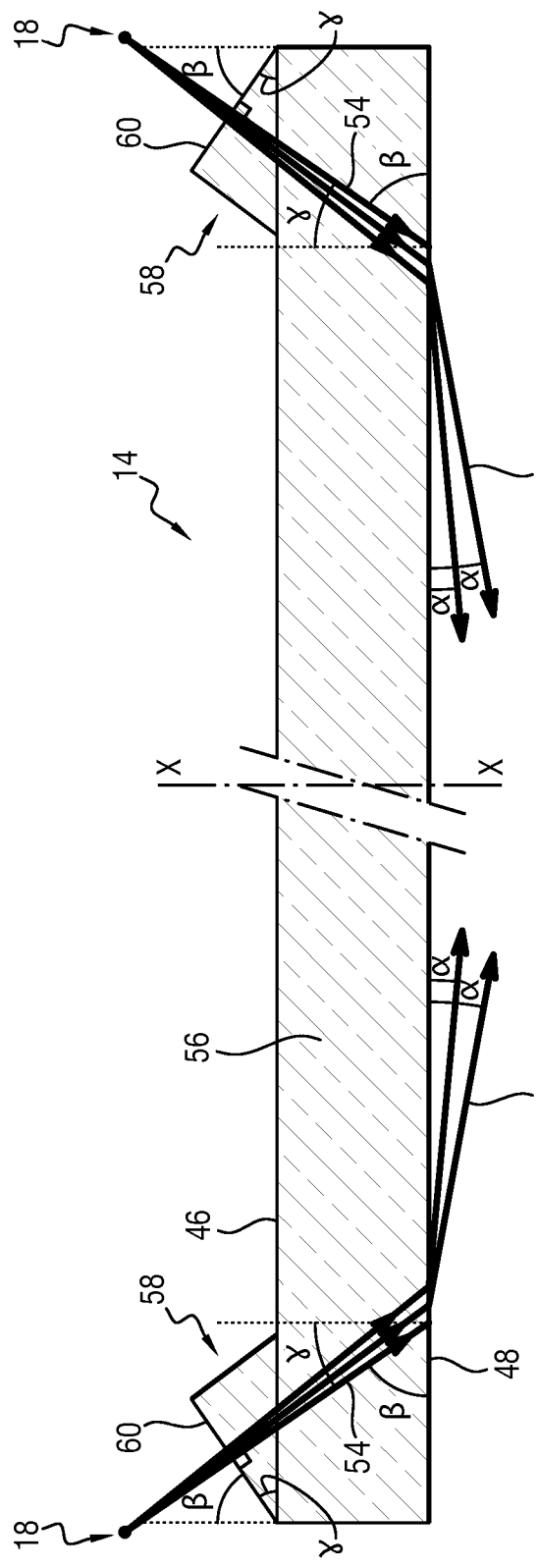
FIG. 4 is a sectional view along section line IV-IV of FIG. 3.

In reference to FIGS. 3 and 4, the pane 14 has a peripheral entry face for incident light beams 54 emitted by the light sources 18.

More specifically, the inner face 46 of the pane 14 has a peripheral entry face for incident light beams 54.

The pane 14 has a substantially parallelepiped plate 56 and four prisms 58.

The prisms 58 are arranged in a square along the four edges of the plate 56. They are pressed against the inner face of the plate 56. The prisms 58 are glued with an optical glue on the inner face of the plate 56. The free faces 60 of the prisms 58 define the peripheral entry face of the incident light beams 54.

These free faces 60 of the prisms 58 are turned radially toward the outside of the plate 56 and form an angle β, strictly greater than 48.19 degrees and close to 48.19 degrees with the direction normal to the plate 56 of the pane 14.

Thus, the peripheral entry face is inclined relative to a direction normal to the plate 56 of the pane 14 and forms an angle β strictly greater than 48.19 degrees with the direction normal to the plate 56.

In other words, the peripheral entry face is inclined by an angle β relative to the direction normal to the outer face 48 of the pane 14.

For example, the angle β is between 48.19 degrees and 57 degrees.

Thus, each free face 60 of a prism 58 forms a portion of the peripheral entry face.

Each portion of the peripheral face is, in this example, adjacent to an edge of the pane 14.

Each portion of the peripheral entry face is therefore also inclined by an angle β relative to the direction normal to the plate 56.

In other words, the peripheral entry face forms an angle γ strictly smaller than 41.81 degrees with a plane parallel to the outer face 18 of the pane 13 and close to 41.81 degrees.

For example, the angle γ is strictly smaller than 41.81 degrees and greater than or equal to 33 degrees.

Each light source 18 is arranged opposite the free face 60 with its illumination direction substantially perpendicular to said free face 60, along the direction normal to the free face 60, and is able to emit a narrow incident beam or array.

For example, the light sources 18 are offset axially relative to the peripheral edge of the pane 14, and more specifically relative to the peripheral edge of the plate 56.

The prisms 58 are chosen from a material having an optical index very close to that of the glass. Thus, the light beams are not deflected when they pass through the prism-plate, diopter. In the case at hand, the prisms 58 are made from plastic such as polymethyl methacrylate (PMMA), the optical index of which of 1.49 is very close to the optical index of glass. In other exemplary embodiments, the prisms are made from another material. It is, however, desirable for this material to have an optical index close to that of the plate 56 of the pane 14. The same angle β is therefore found between the incident beam 54 and the outer face 48 of the pane 14. The angle β of 48.19 degrees corresponds to the total reflection angle of the incident beam on the outer face 48 of the pane 14.

Furthermore, the same angle γ is found between the incident beam 54 and the direction normal to the plate 56.

All of the light beams 55 transmitted through the pane 14 form an angle α smaller than or equal to 35 degrees with the outer face 48 of the pane 14.

According to one exemplary embodiment, all of the light beams 55 transmitted through the pane 14 emerge from the outer face 48 of the pane 14 with an angle α smaller than or equal to 10 degrees.

Figure 5:
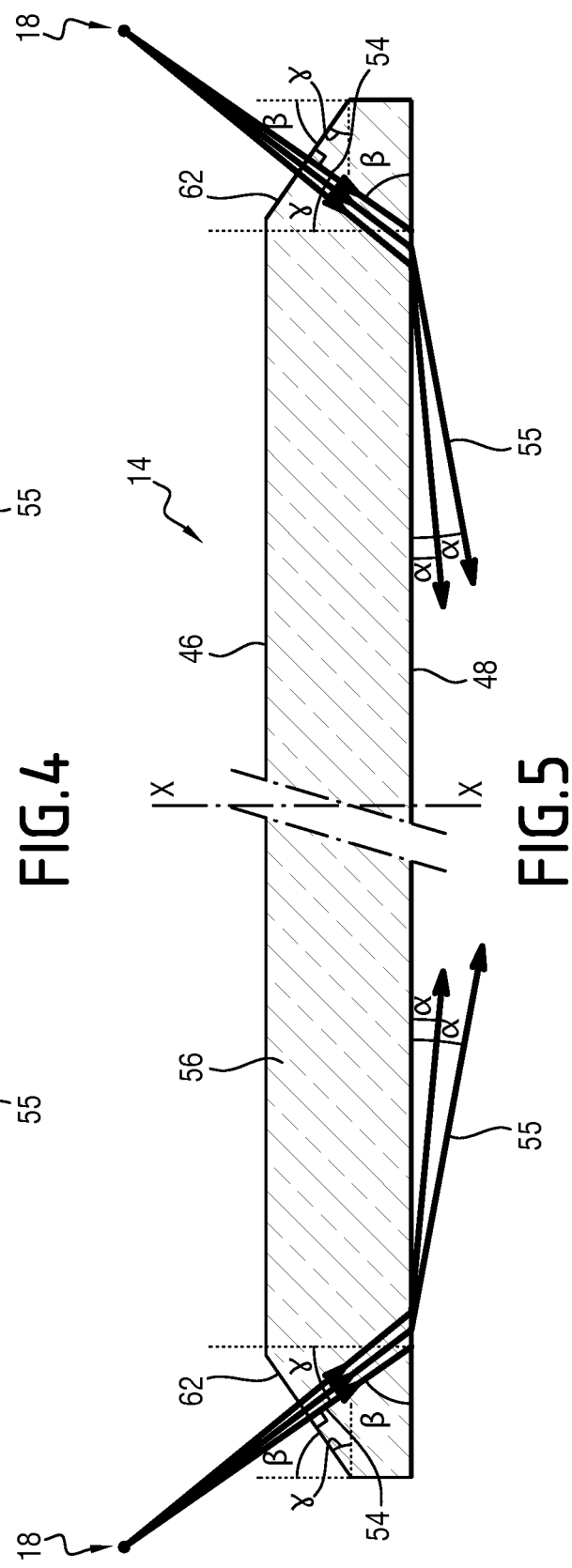
FIG. 5 is a sectional view of the transparent pane according to another embodiment of the barcode reader according to the invention.

FIG. 5 describes another embodiment of the barcode reader 8. The embodiment of FIG. 5 is described only in how it differs from the embodiment described in relation to FIGS. 3 and 4. This embodiment differs from the embodiment of FIGS. 3 and 4 in that the pane 14 does not include a prism 58, but is provided with bevels 54.

More specifically, as shown in FIG. 5, each edge of the plate 56 is provided with a bevel 62 delimiting the peripheral entry face of the incident light beams 54.

The bevels 62 are oriented radially toward the outside of the plate 56 and form an angle β, strictly greater than 48.19 degrees and close to 48.19 degrees with the peripheral edge of the pane 14 that extends along the direction normal to the plate 56 of the pane 14. For example, like before, the angle β is between 48.19 degrees and 57 degrees.

Thus, each bevel 62 forms a portion of the peripheral entry face.

Each light source 18 is arranged opposite a bevel 62 with its illumination direction substantially perpendicular to the bevel 62, along the normal to the bevel 62, and is able to emit a narrow incident beam or array. The light sources 18 are offset axially and radially relative to the edge of the pane 14, and more specifically relative to the edge of the plate 56. For example, the radial offset and the axial offset respectively measure between 5 mm and 15 mm. The incident beams 54 are not deflected when they pass through the bevel 62, and form the same angle β with the outer face 48 of the pane 14.

In a variant, the barcode reader 8 can comprise fewer light sources, for example three light sources 18.

In still another variant, three light sources are suitable for illuminating the barcode carried by the medium 10, and a fourth light source 18 is connected to a control unit controlling its illumination as a function of the reading of the barcode to provide feedback after decoding of the barcode by the reading head 16.

Owing to the barcode reader 8 according to the invention, the user of the barcode reader is not blinded when he scans a barcode.

Furthermore, the barcode reader according to the invention allows optimal reading of the barcode by the reading head. In particular, the illumination of the planar or convex surfaces bearing the barcode is good, in particular without inducing any reflection on said planar, reflective and backlit surfaces of smartphones or tablets bearing the barcode.

The invention claimed is:

1. A barcode reader comprising:
a casing in which a window is arranged;
a transparent pane fastened in the window of the casing, the transparent pane comprising a plate, the transparent pane and the casing defining an inner volume of the barcode reader, the transparent pane having an inner face located in the inner volume and an outer face located outside the inner volume;
a reading head, arranged in the inner volume facing the transparent pane, and configured to acquire a barcode present opposite the outer face of the transparent pane; and
at least one light source arranged in the inner volume, able to emit light beams, and configured to illuminate the barcode, wherein:
the at least one light source and the transparent pane are arranged such that all of the light beams transmitted through the transparent pane emerge from the outer face of the transparent pane with an angle smaller than or equal to 35 degrees with the outer face of the transparent pane, and
the inner face of the transparent pane includes a peripheral entry face for incident beams, the at least one light source being arranged opposite the peripheral entry face with its illumination direction substantially perpendicular to the peripheral entry face, the peripheral entry face being inclined relative to a direction normal to the plate of the transparent pane and forming an angle strictly greater than 48.19 degrees with the direction normal to the plate.

2. The barcode reader according to claim 1, including an opaque screen arranged between an edge of the transparent pane and the at least one light source.

3. The barcode reader according to claim 1, wherein the peripheral entry face has a plurality of portions, each portion of the plurality of portions being adjacent to an edge of the transparent pane, each portion of the plurality of portions of the peripheral entry face being inclined by the angle strictly greater than 48.19 degrees with the direction normal to the plate.

4. The barcode reader according to claim 1, wherein the plate is provided with a bevel delimiting the peripheral entry face.

5. The barcode reader according to claim 1, wherein the transparent pane has a prism alongside the plate, a free face of the prism forming the peripheral entry face.

6. The barcode reader according to claim 1, wherein the at least one light source and the transparent pane are arranged such that all of the light beams transmitted through the transparent pane emerge with an angle smaller than or equal to 10 degrees relative to the outer face of the transparent pane.

7. A barcode reader comprising:
a casing in which a window is arranged;
a transparent pane fastened in the window of the casing, the transparent pane comprising a plate, the transparent pane and the casing defining an inner volume of the barcode reader, the transparent pane having an inner face located in the inner volume and an outer face located outside the inner volume;
a reading head, arranged in the inner volume facing the transparent pane, and configured to acquire a barcode present opposite the outer face of the transparent pane; and
at least one light source arranged in the inner volume, able to emit light beams, and configured to illuminate the barcode, wherein:
the at least one light source and the transparent pane are arranged such that all of the light beams transmitted through the transparent pane emerge from the outer face of the transparent pane with an angle smaller than or equal to 35 degrees with the outer face of the transparent pane,
the inner face of the transparent pane includes a peripheral entry face for incident beams, the at least one light source being arranged opposite the peripheral entry face with its illumination direction substantially perpendicular to the peripheral entry face, the peripheral entry face being inclined relative to a direction normal to the plate of the transparent pane and forming an angle strictly greater than 48.19 degrees with the direction normal to the plate, and
the peripheral entry face having a plurality of portions, each portion of the plurality of portions being adjacent to an edge of the transparent pane, each portion of the plurality of portions of the peripheral entry face being inclined by the angle strictly greater than 48.19 degrees with the direction normal to the plate.

8. A barcode reader comprising:
a casing in which a window is arranged;
a transparent pane fastened in the window of the casing, the transparent pane comprising a plate, the transparent pane and the casing defining an inner volume of the barcode reader, the transparent pane having an inner face located in the inner volume and an outer face located outside the inner volume;
a reading head, arranged in the inner volume facing the transparent pane, and configured to acquire a barcode present opposite the outer face of the transparent pane; and
at least one light source arranged in the inner volume, able to emit light beams, and configured to illuminate the barcode, wherein:
the at least one light source and the transparent pane are arranged such that all of the light beams transmitted through the transparent pane emerge from the outer face of the transparent pane with an angle smaller than or equal to 35 degrees with the outer face of the transparent pane,
the inner face of the transparent pane includes a peripheral entry face for incident beams, the at least one light source being arranged opposite the peripheral entry face with its illumination direction substantially perpendicular to the peripheral entry face, the peripheral entry face being inclined relative to a direction normal to the plate of the transparent pane and forming an angle strictly greater than 48.19 degrees with the direction normal to the plate, and the plate being provided with a bevel delimiting the peripheral entry face.

9. A barcode reader comprising:

a casing in which a window is arranged;

a transparent pane fastened in the window of the casing, the transparent pane comprising a plate, the transparent pane and the casing defining an inner volume of the barcode reader, the transparent pane having an inner face located in the inner volume and an outer face located outside the inner volume;

a reading head, arranged in the inner volume facing the transparent pane, and configured to acquire a barcode present opposite the outer face of the transparent pane; and at least one light source arranged in the inner volume, able to emit light beams, and configured to illuminate the barcode, wherein:

the at least one light source and the transparent pane are arranged such that all of the light beams transmitted through the transparent pane emerge from the outer face of the transparent pane with an angle smaller than or equal to 35 degrees with the outer face of the transparent pane, the inner face of the transparent pane includes a peripheral entry face for incident beams, the at least one light source being arranged opposite the peripheral entry face with its illumination direction substantially perpendicular to the peripheral entry face, the peripheral entry face being inclined relative to a direction normal to the plate of the transparent pane and forming an angle strictly greater than 48.19 degrees with the direction normal to the plate, and the transparent pane having a prism alongside the plate, a free face of the prism forming the peripheral entry face.

* * * * *